United States Patent
Russ

(10) Patent No.: US 9,238,972 B2
(45) Date of Patent: Jan. 19, 2016

(54) RAM AIR TURBINE PUMP LEAKAGE CONTROL

(75) Inventor: David Everett Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 780 days.

(21) Appl. No.: 13/430,925

(22) Filed: Mar. 27, 2012

(65) Prior Publication Data

US 2013/0256454 A1    Oct. 3, 2013

(51) Int. Cl.
    *F03D 11/02*      (2006.01)
    *F01D 15/08*      (2006.01)
    *F01D 15/10*      (2006.01)

(52) U.S. Cl.
CPC ............. *F01D 15/08* (2013.01); *F01D 15/10* (2013.01); *F05D 2220/34* (2013.01); *Y10T 137/0318* (2015.04)

(58) Field of Classification Search
CPC ....... B64D 41/007; F01D 15/08; F01D 15/10; F01D 2220/34
USPC .......................................................... 244/58
See application file for complete search history.

(56) References Cited

U.S. PATENT DOCUMENTS

| | | | |
|---|---|---|---|
| 2,248,405 A | 7/1941 | Freeman | |
| 3,360,239 A | 12/1967 | Swearingen | |
| 4,742,976 A | 5/1988 | Cohen | |
| 4,991,796 A | 2/1991 | Peters et al. | |
| 5,122,036 A | 6/1992 | Dickes et al. | |
| 5,145,324 A | 9/1992 | Dickes et al. | |
| 5,487,645 A | 1/1996 | Eccles | |
| 5,564,903 A | 10/1996 | Eccles et al. | |
| 6,331,099 B1 | 12/2001 | Eccles et al. | |
| 6,580,179 B2 | 6/2003 | Eccles et al. | |
| 6,676,379 B2 | 1/2004 | Eccles et al. | |
| 7,077,631 B2 | 7/2006 | Eccles et al. | |
| 7,086,760 B2 | 8/2006 | Chuang | |
| 2011/0229309 A1 | 9/2011 | Russ | |
| 2011/0229342 A1 | 9/2011 | Russ | |
| 2011/0236218 A1 | 9/2011 | Russ et al. | |
| 2012/0269634 A1* | 10/2012 | Bortoli | F03D 9/00 416/170 R |

FOREIGN PATENT DOCUMENTS

| | | |
|---|---|---|
| CN | 1576595 A | 2/2005 |
| DE | 19827932 A1 | 1/1999 |
| JP | 2004360506 A | 12/2004 |
| KR | 20050010644 A | 1/2005 |

* cited by examiner

*Primary Examiner* — Brian M O'Hara
(74) *Attorney, Agent, or Firm* — Carlson, Gaskey & Olds, P.C.

(57) ABSTRACT

An example ram air turbine drive shaft assembly includes a drive shaft that rotates about an axis to drive a hydraulic pump and a generator. The drive shaft has an interruption that redirects a fluid flowing from the hydraulic pump to the generator when the drive shaft is rotated.

19 Claims, 3 Drawing Sheets

RAM AIR TURBINE PUMP LEAKAGE CONTROL

BACKGROUND

This disclosure relates to ram air turbines utilized to provide emergency power for an aircraft. More particularly, this disclosure relates to controlling fluid within a ram air turbine that supplies both electric and hydraulic power to an aircraft.

A ram air turbine is used to generate supplemental power in an aircraft by extracting power from an air stream along the exterior of the aircraft during flight. The ram air turbine includes a turbine that drives an electric motor or hydraulic pump. In operation, the turbine is moved from a stowed position within the aircraft to a position that provides clearance for blades of the turbine and the aircraft. The turbine is mounted at the end of a strut and drives a turbine drive shaft that in turn drives the electric motor or hydraulic pump. Hydraulic fluid from the hydraulic pump may be damaging to generator components.

SUMMARY

An example ram air turbine drive shaft assembly includes a drive shaft that rotates about an axis to drive a hydraulic pump and a generator. The drive shaft has an interruption that redirects a fluid flowing from the hydraulic pump to the generator when the drive shaft is rotated.

An example ram air turbine assembly includes a hydraulic pump, a generator, a strut movable between a deployed position and a stowed position, and a turbine supported by the strut. A drive shaft is rotatable about a first axis transverse to a rotational axis of the turbine. The drive shaft includes an interruption that limits a flow of fluid from the hydraulic pump to the generator.

An exemplary method of controlling fluid flow in a ram air turbine assembly includes redirecting flow moving in an axial direction against the surface of a drive shaft to flow moving in a radial direction away from the drive shaft to limit flow of the fluid from a hydraulic pump to a generator.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
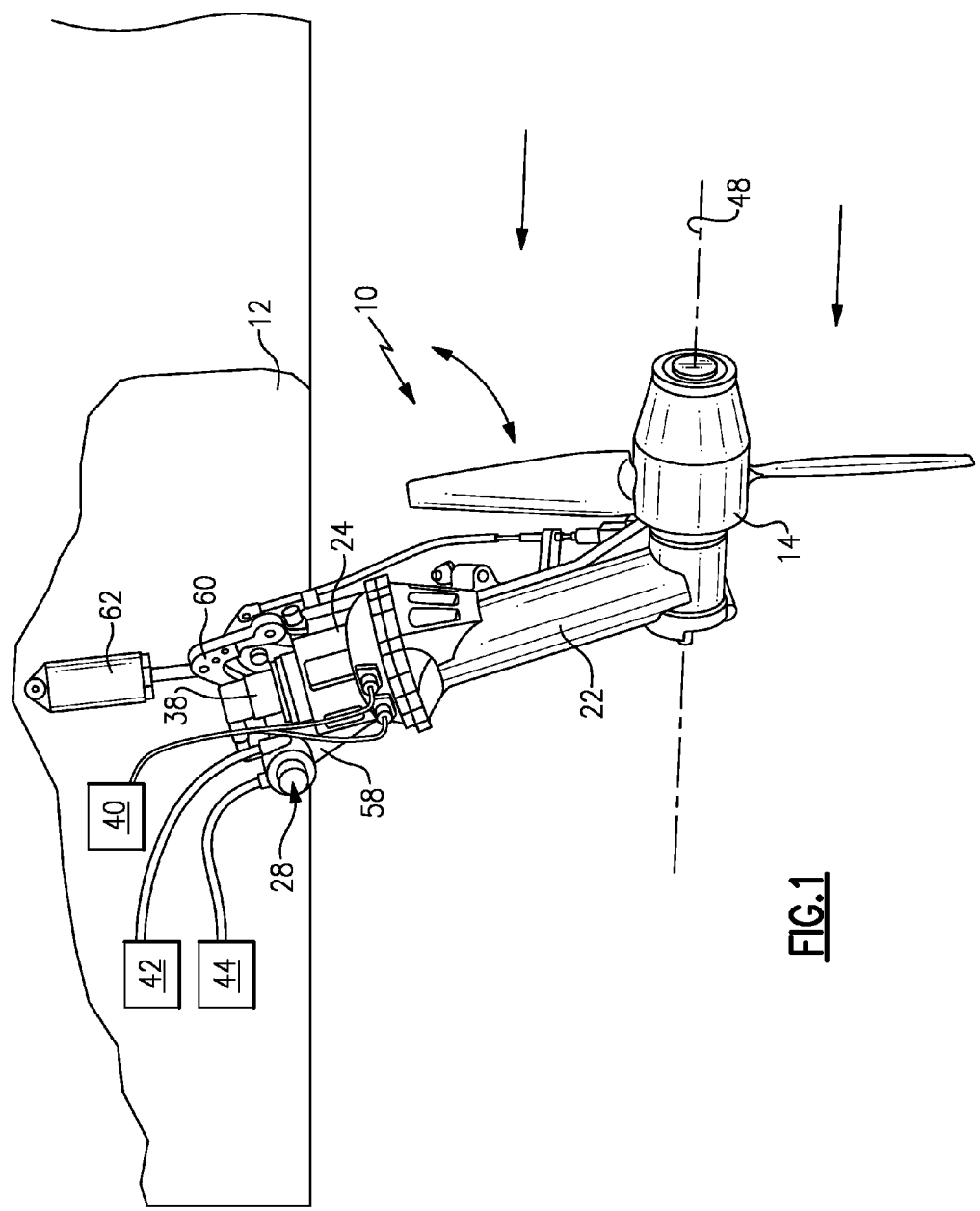
FIG. 1 is a schematic view of an example ram air turbine including a generator and a hydraulic pump.
Figure 2:
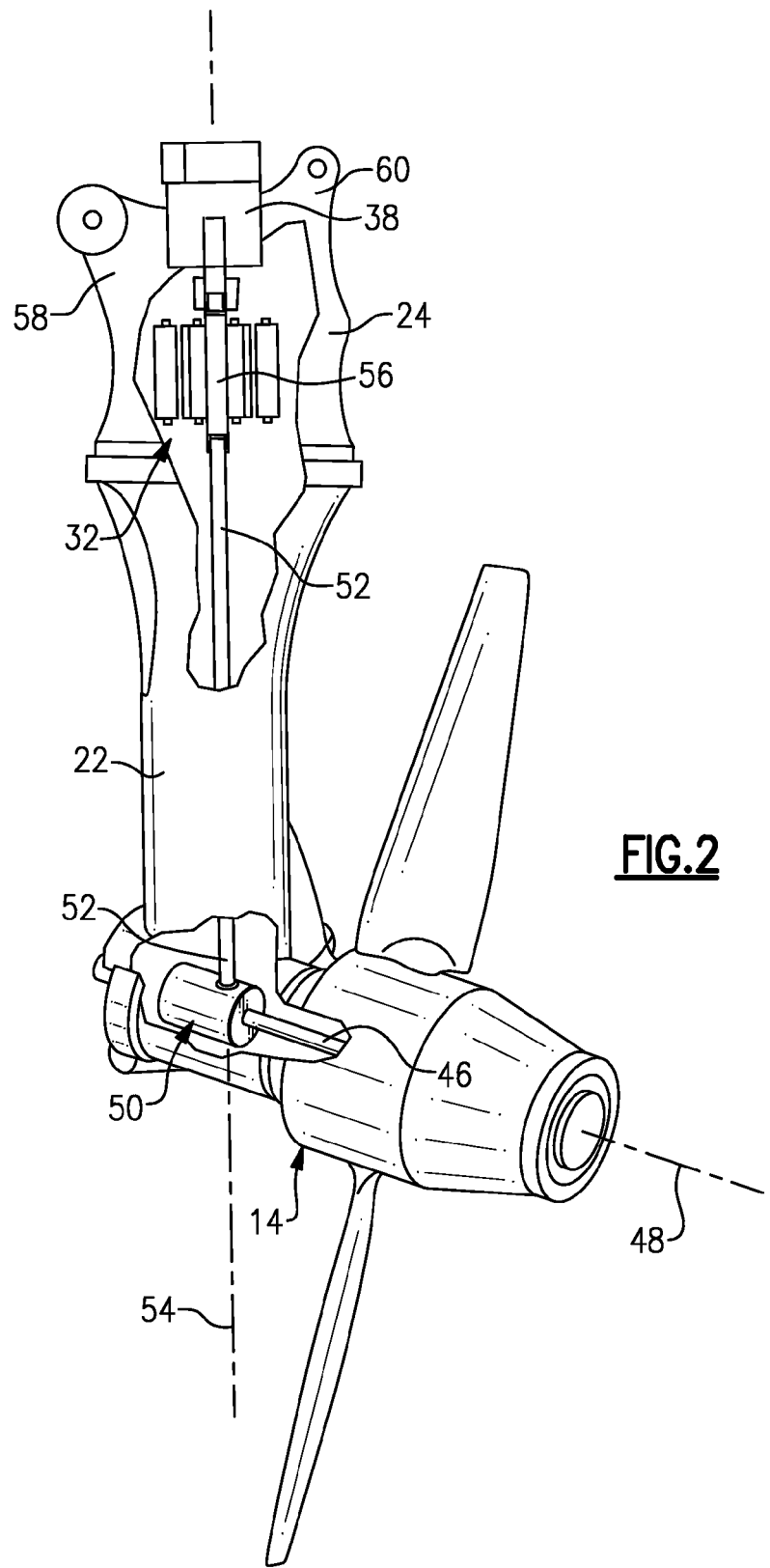
FIG. 2 is a sectional view of the FIG. 1 ram air turbine.

Referring to FIGS. 1 and 2, an example ram air turbine assembly (RAT) 10 is mounted to an airframe 12 and is deployable to provide both electric power and hydraulic pressure. The example RAT 10 includes a turbine 14 that rotates responsive to air flow along the outside of the airframe 12. The turbine 14 is supported at the end of strut 22 attached to a generator housing 24. The generator housing 24 is mounted for rotation to the airframe 12 with a swivel post 28.

A generator 32 disposed within the generator housing 24 is coupled to a hydraulic pump 38. The generator 32 generates electric power that can be supplied to an aircraft system such as is schematically indicated at 40. The hydraulic pump 38 receives fluid from a fluid supply 44 and pumps the fluid to various systems indicated at 42 that utilize pressurized fluid for operation.

The turbine 14 rotates to drive a turbine shaft 46 about an axis 48. The turbine shaft 46 drives a gearbox 50. The example gearbox 50 is disposed aft of the turbine 14 and along the axis 48 of rotation of the turbine 14 and turbine shaft 46. The example gearbox 50 drives a drive shaft 52 that rotates about an axis 54 that is transverse to the axis 48. The drive shaft 52 extends from the gearbox 16 through the strut 22 to the generator 32. The drive shaft 52 is coupled to drive the generator 32 at a desired speed.

The example gearbox 50 includes gears that provide a desired ratio of rotational speed between the turbine shaft 46 and the drive shaft 52. In this example, the drive shaft 52 is rotated at a greater speed than the turbine shaft 46. The gearbox 50 can be configured to provide any desired speed ratio relative to rotation of the turbine 14.

The speed at which the drive shaft 52 is rotated is determined to provide the desired rotational speed required to drive the generator 32 and produce a desired amount of electrical energy at the desired frequency. The electrical energy produced by the generator 32 is then transmitted to the aircraft system schematically indicated at 40.

A second drive shaft 56 couples the hydraulic pump 38 in rotation with the generator 32 such that the hydraulic pump 38 rotates at the same speed as the generator 32. As the hydraulic pump 38 and the generator 32 are coupled to rotate together, the hydraulic pump 20 communicates pressurized fluid to the aircraft systems 40 at the same time as the generator 18 produces electric power.

The generator 18 is supported within the generator housing 24 at an end distal from the turbine 14. The generator housing 24 includes a mounting bracket 60 and an integral swivel bracket 58. The mounting bracket 60 attaches to an actuator 62. The actuator 62 drives movement of the RAT 10 between a stowed position within the airframe 12 and the deployed position schematically shown in FIG. 1.

The swivel bracket 58 mounts to the swivel post 28 to support the RAT 10. The strut 22 is attached to the generator housing 24 and therefore moves with the pivoting movement of the generator housing 24. The hydraulic pump 20 is mounted to the generator housing 24 and therefore also rotates with the generator housing 24 during movement to the deployed position.

Figure 3:
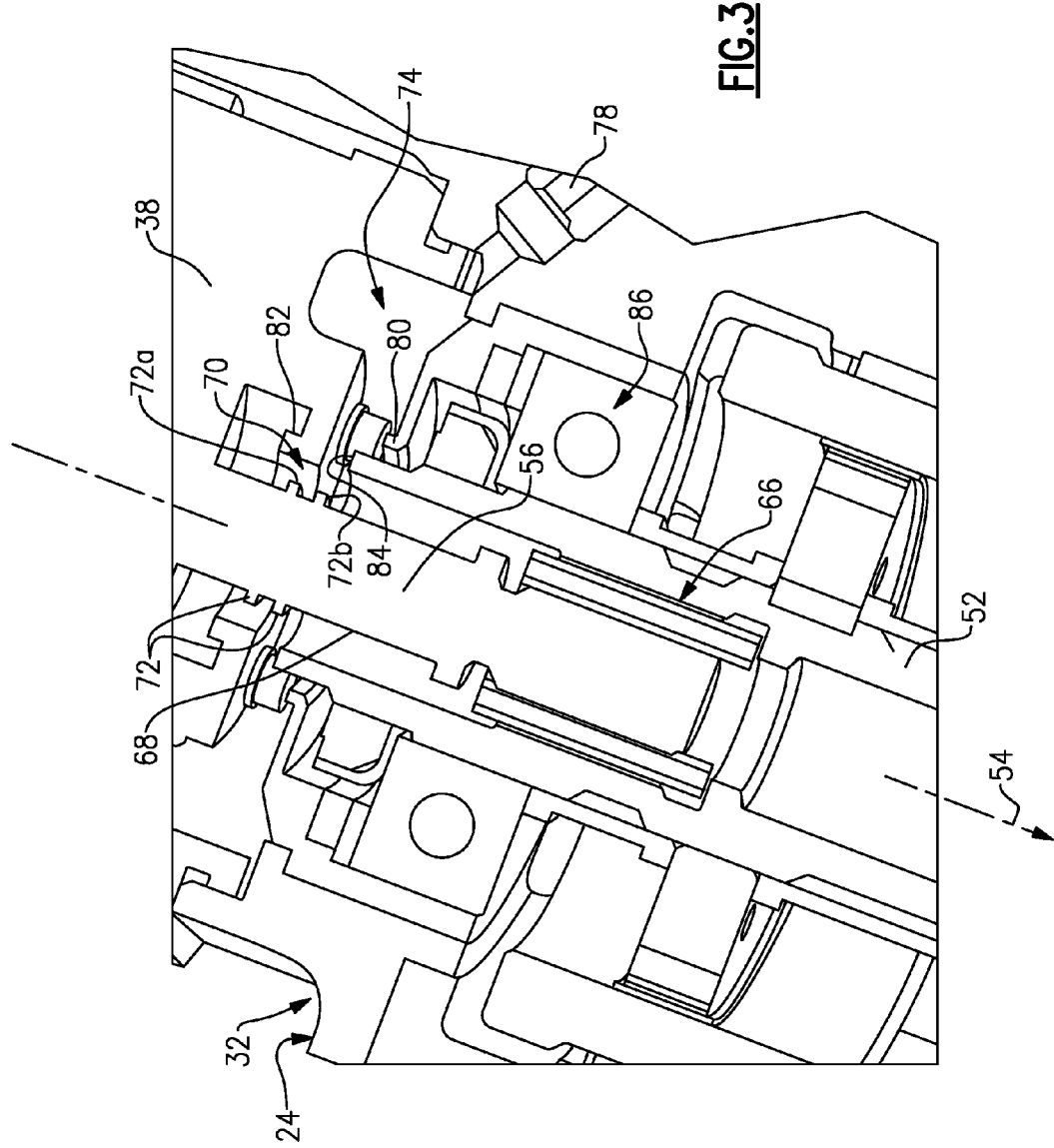
FIG. 3 is a close-up sectional view of an interface between the generator and the hydraulic pump of the FIG. 1 ram air turbine.

Referring to FIG. 3, the second drive shaft 56 is rotated by the main drive shaft 52 through a spline connection 66. The second drive shaft 56 couples rotation of rotors within the generator 32 with rotation of the hydraulic pump 38. In other examples, the second drive shaft 56 is not a separate shaft but is instead a continuation of the drive shaft 52.

The hydraulic pump 38 is mostly vertically above the generator 32 when the RAT 10 is deployed. When deployed, some of the face seal leakage flows from the hydraulic pump 38 against an exterior surface 68 of the second drive shaft 56, and toward the generator 32. The example fluid is hydraulic fluid such as SKYDROL® or some other type of phosphate ester hydraulic fluid. The fluid can damage components of the generator 32 as is known. When not deployed, the fluid is not in a position to flow downward along the exterior surface 68.

The example second drive shaft 56 includes an interruption 70 that limits flow of fluid from the hydraulic pump 38 to the generator 32. The interruption 70 is axially between the hydraulic pump 38 and the generator 32. The example interruption 70 includes two ribs 72 extending radially from the exterior surface 68 positioned axially between the generator 32. The ribs 72 are axially spaced from each other, and each of the ribs 72 extends circumferentially and continuously about the entire axis 54.

In one specific example, the diameter of the second drive shaft 56 is about 0.65 inches (1.65 centimeters), and the ribs 72 each extend more than about 0.005 inches (0.127 millimeters) from the exterior surface 68. In some examples, the ribs extend about 0.039 inches (1 millimeter) from the exterior surface 68.

The ribs 72 may be considered slinger rings. Other examples of the interruption 70 may include other numbers of ribs or other features.

The example interruption 70 redirects fluid flowing from the hydraulic pump 38 to the generator 32 when the second drive shaft 56 is rotated. In some examples, the second drive shaft 56 rotates at about 12,000 rotations per minute. As the fluid flow moves over the interruption 70, the fluid is moved radially outward, which causes the fluid to separate from the drive shaft 56 and to move radially outward due to the increased centrifugal force. The fluid moves from the second drive shaft 56 into a cavity 74 that extends about the axis 54. One of the ribs 72a is located radially inside of a pump ring 82 to direct leakage away from shaft 56 at the first opportunity. Most of the leakage will encounter the inner diameter of the pump ring 82, and gravity will cause it to flow from there to drain passage 78 (since the generator shaft 56 is not quite vertical when deployed).

Fluid that gets by the rib 72a will encounter the rib 72b, which will expel the fluid into cavity 74. Fluid that somehow passes both ribs 72a and 72b and enters the region between the rib 72b and the splined portion of the shaft 56 will be centrifugally expelled to the inner diameter of the shaft 52, where it can then be flung out into cavity 74.

The generator 18 is constructed from materials that can withstand the occasional splash of hydraulic fluid. But full immersion or sustained contact would be undesirable. The fluid exclusion features described are designed to prevent this. An air gap exists between the second drive shaft 56 and a shield 80 to avoid seal drag or seal friction heating with unreliable lubrication that could occur on a rapidly rotating shaft.

The example cavity 74 is an annular cavity in this example. A portion of the cavity 74 is provided by a housing 76 of the hydraulic pump 38, and another portion of the cavity 74 is provided by the generator housing 24. A conduit 78 drains the fluid from the cavity 74 into an ecology bottle (not shown) that can be removed from the RAT 10.

The example generator 18 includes a shield 80 that is integral with a bearing liner of the RAT 10. Fluid that lands on the shield 80 tends to move toward the conduit 78 due to gravity. The shield 80 has a raised flange on the inside of the shield 80 that keeps fluid from dripping into bearing areas 86 of the generator 18. Gravity keeps fluid from travelling over the flange. The flange is located axially away from an end 84 of the drive shaft 52 so fluid from inside the drive shaft 52 can spray harmlessly past the gap to the bearing areas 86.

In some examples, an O-ring (not shown) may surround the second drive shaft 56 between the hydraulic pump 20 and the generator 18.

Features of the disclosed examples include providing inline power generation with a single gearbox 16 that drives both the generator 18 and the hydraulic pump 20 while limiting leakage flow from the hydraulic pump 20 to the generator.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A ram air turbine drivetrain assembly comprising:
a strut movable between a deployed position and a stowed position,
a turbine supported by the strut and connected to a turbine shaft;
a housing containing a hydraulic pump and a generator; and
a drive shaft that rotates about a drive shaft axis to directly drive the hydraulic pump and the generator when the drive shaft is in the deployed position, the drive shaft axis transverse to a rotational axis of the turbine shaft, the drive shaft having an interruption that redirects a fluid flowing from the hydraulic pump to the generator when the drive shaft is rotated about the drive shaft axis into an annular cavity provided by the housing, the drive shaft supported in the strut, wherein the drive shaft, the hydraulic pump, and the generator are axially aligned.

2. The ram air turbine driveshaft assembly of claim 1, wherein the interruption comprises a rib extending radially from the drive shaft.

3. The ram air turbine driveshaft assembly of claim 1, wherein the interruption comprises the rib and a second rib extending radially from the drive shaft, the rib and the second rib axially spaced from each other.

4. The ram air turbine driveshaft assembly of claim 1, wherein the interruption is positioned axially between a portion of the drive shaft that interfaces directly with the hydraulic pump and a portion of the drive shaft that interfaces directly with the generator.

5. The ram air turbine driveshaft assembly of claim 1, wherein the interruption extends circumferentially and continuously about the entire axis.

6. The ram air turbine driveshaft assembly of claim 1, wherein the hydraulic pump is vertically above the generator when in the deployed position.

7. The ram air turbine driveshaft assembly of claim 1, wherein the fluid is hydraulic fluid.

8. The ram air turbine driveshaft assembly of claim 1, wherein the interruption redirects fluid flowing axially against the drive shaft in a radial direction away from the drive shaft.

9. The ram air turbine drivetrain assembly of claim 1, wherein the turbine is a ram air turbine and rotates the turbine drive shaft.

10. The ram air turbine driveshaft assembly of claim 1, wherein the fluid is leakage from the hydraulic pump.

11. The ram air turbine driveshaft assembly of claim 1, wherein the drive shaft, the hydraulic pump, and the generator are coaxially aligned.

12. The ram air turbine drivetrain assembly of claim 1, wherein the hydraulic pump moves together with the generator from the stowed position to the deployed position and from the deployed position to the stowed position.

13. The ram air turbine drivetrain assembly of claim 1, wherein the hydraulic pump is moveable from the stowed position to the deployed position and from the deployed position to the stowed position.

14. A ram air turbine assembly, comprising:
a hydraulic pump;
a generator;

a strut movable between a deployed position and a stowed position, the strut having a generator housing wherein both the hydraulic pump and generator are mounted in the generator housing;

a turbine supported by the strut and connected to a turbine shaft; and a drive shaft rotatable about a first axis transverse to a rotational axis of the turbine shaft, the drive shaft driven by the turbine shaft to directly drive the hydraulic pump and the generator to rotate about the first axis when the hydraulic pump and the generator are in the deployed position, the drive shaft including an interruption that limits a flow of fluid from the hydraulic pump to the generator;

wherein the interruption redirects fluid into an annular cavity provided by the generator housing.

15. The ram air turbine assembly of claim 14, including a conduit that drains the fluid from the annular cavity.

16. The ram air turbine assembly of claim 14, wherein the fluid is SKYDROL®.

17. The ram air turbine assembly of claim 14, wherein the generator is axially closer to the turbine than the hydraulic pump.

18. The ram air turbine assembly of claim 14, wherein the hydraulic pump, the generator, and the drive shaft are coaxially aligned.

19. The ram air turbine assembly of claim 14, wherein the hydraulic pump is moveable from the stowed position to the deployed position and from the deployed position to the stowed position.

* * * * *